United States Patent
Ikeda

(10) Patent No.: US 8,495,989 B2
(45) Date of Patent: Jul. 30, 2013

(54) GASKET OF AN INTERNAL COMBUSTION ENGINE AND INTERNAL COMBUSTION ENGINE

(75) Inventor: Yuji Ikeda, Kobe (JP)

(73) Assignee: Imagineering, Inc., Kobe-shi (JP)

( * ) Notice: Subject to any disclaimer, the term of this patent is extended or adjusted under 35 U.S.C. 154(b) by 513 days.

(21) Appl. No.: 12/881,849

(22) Filed: Sep. 14, 2010

(65) Prior Publication Data
US 2011/0001294 A1 Jan. 6, 2011

Related U.S. Application Data

(63) Continuation-in-part of application No. PCT/JP2009/054961, filed on Mar. 13, 2009.

(30) Foreign Application Priority Data

Mar. 14, 2008 (JP) .................................. 2008-066885

(51) Int. Cl.
*F02B 51/00* (2006.01)

(52) U.S. Cl.
USPC .......................................... 123/536; 277/592

(58) Field of Classification Search
USPC .......................................... 123/536; 277/592
See application file for complete search history.

(56) References Cited

U.S. PATENT DOCUMENTS

| | | | |
|---|---|---|---|
| 2005/0110222 A1* | 5/2005 | Matsumoto et al. | 277/592 |
| 2007/0209634 A1* | 9/2007 | Minami | 123/310 |
| 2009/0139308 A1* | 6/2009 | Matsumoto et al. | 73/35.08 |

FOREIGN PATENT DOCUMENTS

| | | |
|---|---|---|
| JP | 57-148022 A | 9/1982 |
| JP | 3-31579 A | 2/1991 |
| JP | 2000-179412 A | 6/2000 |
| JP | 2000-230426 A | 8/2000 |
| JP | 2002-295259 A | 10/2002 |
| JP | 2002-295264 A | 10/2002 |
| JP | 2005-090722 A | 4/2005 |
| JP | 2007-113570 A | 5/2007 |

OTHER PUBLICATIONS

International Search Report of PCT/JP2009/054961, mailing date Apr. 28, 2009.

\* cited by examiner

*Primary Examiner* — Marguerite McMahon
*Assistant Examiner* — James Kim
(74) *Attorney, Agent, or Firm* — Westerman, Hattori, Daniels & Adrian, LLP

(57) ABSTRACT

A gasket of an internal combustion engine includes a discharge line installed in an intermediate layer and having an outer end exposed from the outer peripheral edge of the gasket to be a first connection part and an inner end exposed from a inner peripheral edge around the opening to be an electrode, configured such that discharge is generated between electrodes with voltage applied between first connection parts; an antenna installed at least partly in the intermediate layer at the inner peripheral edge around the opening to radiate electromagnetic waves into a combustion chamber; and an electromagnetic wave transmission line installed in the intermediate layer, having an outer end exposed from an outer peripheral edge to be a second connection part and an inner end connected to the antenna, and guiding electromagnetic waves to the antenna.

17 Claims, 10 Drawing Sheets

GASKET OF AN INTERNAL COMBUSTION ENGINE AND INTERNAL COMBUSTION ENGINE

TECHNICAL FIELD

The present disclosure belongs to the technical field of an internal combustion engine, and relates to a gasket installed between the cylinder block and the cylinder head assembled to the anti-crankcase side of the cylinder block.

BACKGROUND OF THE INVENTION

Patent Document 1 shows an internal combustion engine including a combustion/reaction chamber, auto-ignition means, microwave radiation means, and control means. The combustion/reaction chamber consists of a cylinder and piston. The combustion/reaction chamber is supplied with a mixture of reactive and oxidation gas. In the combustion/reaction chamber, a plasma reaction of the mixture is carried out. The auto-ignition means automatically ignites the mixture by injecting a mixture of reactive and oxidation gas under high pressure, compressing the mixture and increasing the temperature. The microwave radiation means radiates the combustion/reaction chamber with microwaves. The control means controls the auto-ignition means and microwave radiation means, and repeats a cycle that involves radiating the combustion/reaction chamber with microwaves so that large amounts of hydroxyl (OH) radicals and ozone ($O_3$) are generated from the moisture in the combustion/reaction chamber mixture, which then oxidizes and reacts chemically, combustion of the mixture in the combustion/reaction chamber is promoted by the large amount of OH radicals and $O_3$, when the auto-ignition, means ignites the mixture.

The internal-combustion engine with an electrical field formed in the combustion chamber is disclosed in Patent Documents 2 to 4. Patent Document 2 outlines an internal combustion engine, containing the following: a cylinder block with a cylinder wall; a cylinder head on the cylinder block; a piston in the cylinder block; a combustion chamber formed by the cylinder wall, cylinder head and piston; and an electrical field apply means for applying an electrical field in the combustion chamber during combustion of the engine. When an electrical field is applied to the flame in this internal combustion engine, ions move into the flame and collide. This increases the flame propagation speed, and the ions in the gas that has already burnt move to unburned gas and alter the chemical reaction in the unburned gas. This maintains a uniform flame temperature and controls engine knock.

In the art of Patent Documents 2, said electrical field apply means comprises a conductive member arranged so as to apply the electrical field in the combustion chamber. This conductive member is a nickel-chromium alloy wire, with a preferable diameter of 1.0 mm, and installed in an annular groove established in an annular insulator inserted in the cylinder wall of the cylinder block. In the art of Patent Documents 2 through 4, the substantial modifications required for the cylinder block and other structural components of a conventional internal combustion engine. These modifications increase the time required to design an engine, and do not permit the sharing of parts with existing internal combustion engines.

[Patent Document 1] Japanese Patent Application Laid-open Publication No. 2007-113570
[Patent Document 2] Japanese Patent Application Laid-open Publication No. 2000-179412
[Patent Document 3] Japanese Patent Application Laid-open Publication No. 2002-295259
[Patent Document 4] Japanese Patent Application Laid-open Publication No. 2002-295264

SUMMARY OF THE INVENTION

In the present disclosure, a small amount of plasma is discharged firstly. The plasma is irradiated with microwaves for a given period of time, so that the amount of plasma increases. Thus a large amount of OH radicals and ozone is generated from moisture in the air-fuel mixture within a short period of time, promoting an air-fuel mixture reaction. This mechanism of the combustion promotion, obtained by generating a large amount of OH radicals and ozone, promotes combustion with plasma, is entirely different from combustion-promoting mechanisms that use ions to increase flame propagation speed, disclosed in Patent Documents 2 through 4.

In the view of the foregoing, the present disclosure has been achieved. A feature of the present disclosure provides a gasket of an internal combustion engine and an internal combustion engine using this gasket, which can easily realize the combustion-promoting mechanism, obtained by generating a large amount of OH radicals and ozone with plasma, by using the existing internal combustion engine. By this realization, it can be realized to minimize the time required to design an engine and facilitate the sharing of many parts between existing internal combustion engines.

The present disclosure is a gasket of an internal combustion engine, which is installed between a cylinder block and a cylinder head so that its opening corresponds to a cylinder, a piston fits into the cylinder and reciprocates freely, the cylinder penetrates the cylinder block, the cylinder head is assembled on the anti-crankcase side of the cylinder block to create a combustion chamber with the piston and the cylinder, the gasket of an internal combustion engine comprises a discharge line installed in an intermediate layer in the thickness direction, having an outer end exposed from the outer peripheral edge to be a first connection part and an inner end exposed from a inner peripheral edge around the opening to be an electrode, and configured such that discharge is generated between electrodes or the electrode and an ground member around it with voltage applied between first connection parts or the first connection part and the ground member, an antenna installed at least partly in the intermediate layer in the thickness direction at the inner peripheral edge around the opening to radiate electromagnetic waves into the combustion chamber, and an electromagnetic wave transmission line installed in the intermediate layer in the thickness direction, having an outer end exposed from the outer peripheral edge to be a second connection part and an inner end connected to the antenna, and guiding electromagnetic waves to the antenna, wherein the discharge line, the antenna, and the electromagnetic wave transmission line are electrically insulated from both surfaces of the gasket in the thickness direction.

The gasket is installed between the cylinder block and cylinder head so that its opening corresponds to the cylinder. A piston fits into the cylinder and reciprocates freely. The internal combustion engine operating normally such as gasoline engine and diesel engine is assembled up. It makes it possible to apply voltage between the first connection parts of the discharge line or the first connection part and the ground member. It makes it possible to feed electromagnetic waves between the second connection part and the ground member for a constant time. And voltage is applied to the first connection part of the discharge line and so on and the electromagnetic waves is fed to the second connection part of the electromagnetic wave transmission line and so on at the compression stroke in the actuation of the internal combustion engine. Therefore, the plasma is generated near the electrode. This plasma receives energy of an electromagnetic waves (electromagnetic wave pulse) supplied from the antenna for a given period of time. As a result, the plasma generates a large amount of OH radicals and ozone to promote the combustion. In fact electrons near the electrode are accelerated, fly out of the plasma area, and collide with gas such as air or the air-fuel mixture in surrounding area of said plasma. The gas in the surrounding area is ionized by these collisions and becomes plasma. Electrons also exist in the newly formed plasma. These also are accelerated by the electromagnetic wave pulse and collide with surrounding gas. The gas ionizes like an avalanche and floating electrons are produced in the surrounding area by chains of these electron acceleration and collision with electron and gas inside plasma. These phenomena spread to the area around discharge plasma in sequence, then the surrounding area get into a plasma state. In the result of the phenomena as mentioned above it, the volume of plasma increases. Then the electrons recombine rather than dissociate at the time when the electromagnetic wave pulse radiation is stopped. As a result, the electron density decreases, and the volume of plasma decreases as well. The plasma disappears when the electron recombination is completed. A large amount of OH radicals and ozone is generated from moisture in the gas mixture as a result of a large amount of the generated plasma, promoting the combustion of the mixture.

In this case, the cylinder block and cylinder head etc. which are the major structural materials can be used without modification compared with an existing internal combustion engine. All that is required are the applying of voltage to the discharge line and the supply of the electromagnetic waves. Thus, it is realized to minimize the time required to design an engine and facilitate the sharing of many parts between existing internal combustion engines.

The gasket of an internal combustion engine of the present disclosure may be applicable for which the intermediate layer is made from an insulator or dielectric, and a surface layer on at least one side to the intermediate layer in the thickness direction is made from conductive material.

This makes it possible that the surface layer functions as an ground electrode that pairs with the discharge line electrode. The surface layer also functions as an ground conductive material that pairs with the electromagnetic wave transmission line. The electromagnetic waves are transmitted between the electromagnetic wave transmission line and the surface layer. Moreover, the rigidity of the gasket is improved if the surface layer is made from metal etc.

The gasket of an internal combustion engine of the present disclosure may be applicable for which the antenna is rod-shaped, the base end of the antenna is installed in the intermediate layer in the thickness direction, and a portion, to the leading end except the base end, extends along the inner peripheral edge around the opening in the circumferential direction of the opening.

This makes it possible that the electrical field intensity near the outer edge of the combustion chamber, generated by the electromagnetic waves radiated from the antenna, is stronger than the electrical field intensity in other areas of the combustion chamber. Therefore, the amount of OH radicals and ozone in the vicinity of the outer edge of the combustion chamber is more than the amount of other areas. Combustion in this area is promoted more than in other areas. Mixing of OH radicals or ozone and the air-fuel mixture is promoted by Squish Flow, Tumble or Swirl in the vicinity of the outside edge of the combustion chamber.

The gasket of an internal combustion engine of the present disclosure may be applicable for which the electrode is located close to a portion of strong electrical field intensity in the antenna due to the electromagnetic waves when the electromagnetic waves are fed to the antenna.

This makes it possible that the electrical field intensity, due to the electromagnetic waves radiated from said portion of the antenna, is stronger than the electrical field intensity of the surrounding electromagnetic waves. Therefore, the energy of the electromagnetic wave pulse is intensively supplied to the plasma generated by discharge at the electrode. As a result, a large amount of OH radicals and ozone is efficiently generated, further promoting combustion in the area centered at the electrode. When there are multiple areas of the antenna with strong electrical field intensity, combustion at multiple areas of the combustion chamber is further promoted upon the portion approaching to the electrode.

The gasket of an internal combustion engine of the present disclosure may be applicable for which a shielded cable is installed in the intermediate layer, and the cable core of the inner electrical cable of the shielded cable works for the discharge line or the electromagnetic wave transmission line.

This makes it possible that the gasket is composed comparatively easily by using the shielded cable.

The gasket of an internal combustion engine of the present disclosure may be applicable for which the discharge lines are coupled, and the electrodes of these discharge lines are close to each other.

This makes it possible that a discharge is generated between the electrodes when voltage is applied between first connection parts of the discharge line. When the electrodes of these discharge lines are arranged adjacent to each other, a discharge can be generated using a low voltage. And the generation of OH radicals and ozone is promoted. The duration of this generated OH radicals and ozone becomes long. Power consumption is reduced. Moreover, the amount of nitrogen oxide (NOx) in the internal combustion engine is reduced because of the reduction of temperature rise in the area where discharge is generated.

The internal combustion engine of the present disclosure comprises a cylinder block in which a cylinder is formed to penetrate it and a piston fits into the cylinder and reciprocates freely, a cylinder head assembled on the anti-crankcase side of the cylinder block to create the combustion chamber with the piston and the cylinder, and a gasket of an internal combustion engine assembled between the cylinder block and the cylinder head.

DETAILED DESCRIPTION OF THE INVENTION

Figure 1:
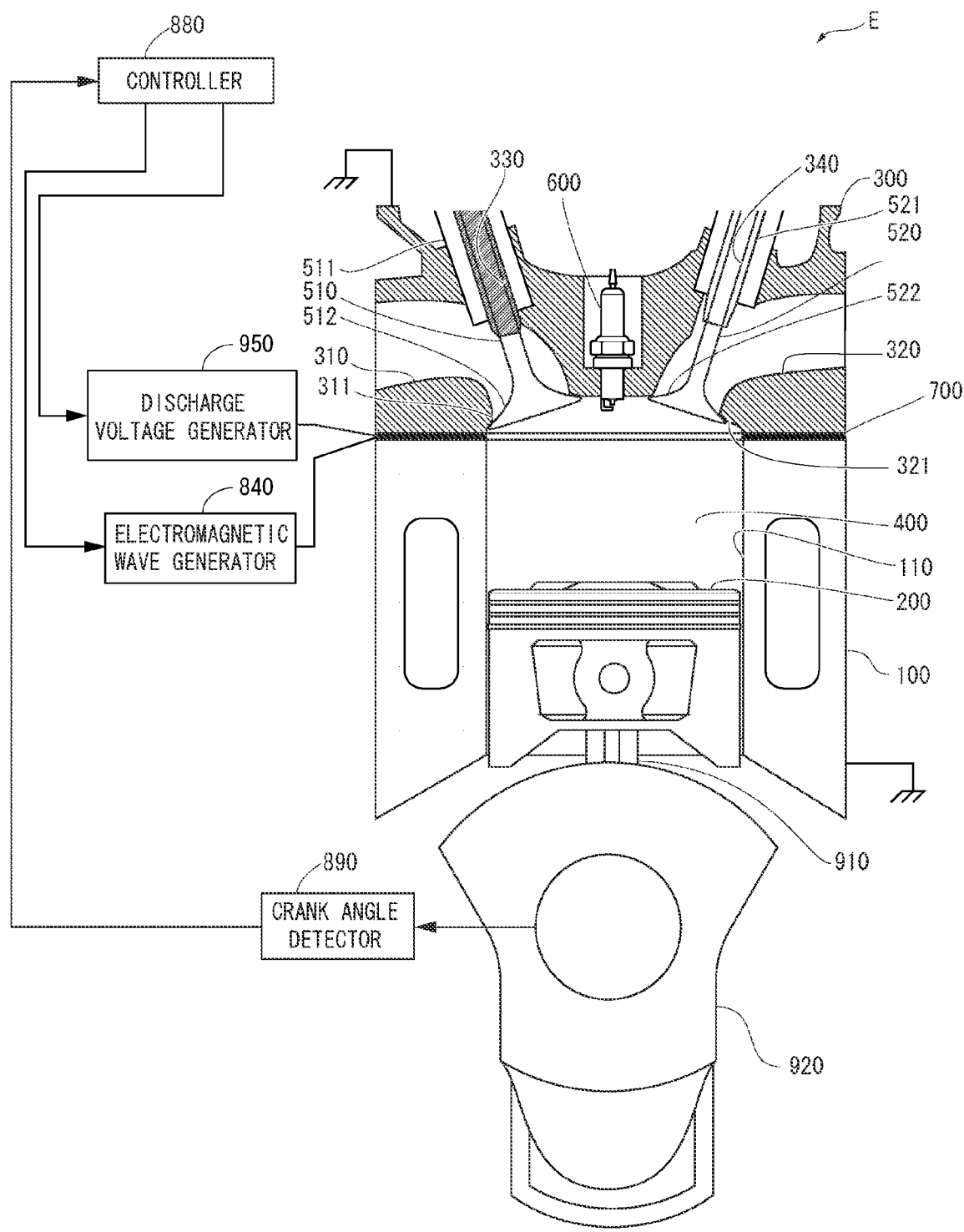
FIG. 1 shows a vertical cross-sectional view of combustion chamber in an internal combustion engine with the gasket in the first embodiment of the present disclosure.

Hereinafter, embodiments of the present disclosure will be described. FIG. 1 shows the embodiment of the gasket of an internal combustion engine E of the present disclosure. The present disclosure targets reciprocating engines. In this embodiment, engine E is a four-cycle gasoline engine. Item 100 is the cylinder block. Cylinder block 100 contains cylinder 110, which has an approximately circular cross section. Cylinder 110 penetrates cylinder block 100. Piston 200, which has an approximately circular cross section corresponding to cylinder 110, fits into cylinder 110 and reciprocates freely. Cylinder head 300 is assembled on the anticrankcase side of cylinder block 110. Cylinder head 300, piston 200, and cylinder 110 form combustion chamber 400. Item 910 is a connecting rod, with one end connected to piston 200 and the other end connected to crankshaft 920, which is the output shaft. Cylinder head 300 has intake port 310, which is a component of the intake line, and exhaust port 320, which is a component of the exhaust line. One end of intake port 310 connects to combustion chamber 400; the other end is open at the outside wall of cylinder head 300. One end of exhaust port 320 connects to combustion chamber 400; the other end is open at the outside wall of cylinder head 300. The cylinder head has guide hole 330 that passes through intake port 310 to the outside wall of cylinder head 300. Valve stem 511 of intake valve 510 fits into guide hole 330 and reciprocates freely. Valve head 512, set at the end of valve stem 511, opens and closes the combustion chamber side opening of intake port 310 at a given timing by a valve open/close mechanism having a cam and so on(not shown in the figure). Cylinder head 300 has guide hole 340 that passes through exhaust port 320 to the outside wall of cylinder head 300. Valve stem 521 of exhaust valve 520 fits into guide hole 340 and reciprocates freely. Valve head 522, set at the end of valve stem 521, opens and closes the combustion chamber side opening 321 of the exhaust port 320 at a given time by the valve open/close mechanism having cam and so on (not shown in the figure). Item 600 is a spark plug installed in cylinder head 300 to expose the electrode to combustion chamber 400. Spark plug 600 discharges at the electrodes when piston 200 is near top dead center. Therefore, four strokes (intake, compression, combustion of mixture, and exhaust of exhaust gas) occur while piston 200 reciprocates between top dead center and bottom dead center twice. However, this embodiment does not restrict the interpretation of the internal combustion engine targeted by the present disclosure. The present disclosure is also suitable for use with two-stroke internal combustion engines and diesel engines. Target gasoline engines include direct-injection gasoline engines, which create a mixture inside the combustion chamber to inject fuel into the intake air. Target diesel engines include direct-injection diesel engines, which inject fuel into the combustion chamber directly, and divided-chamber diesel engines, which inject fuel into a divided chamber. Internal combustion engine E in this embodiment has four cylinders, but this does not restrict the number of cylinders of the internal combustion engine targeted by the present disclosure. The internal combustion engine for this embodiment has two intake valves 510 and two exhaust valves 520, but this does not restrict the number of intake or exhaust valves of the internal combustion engine targeted by the present disclosure.

Figure 2:
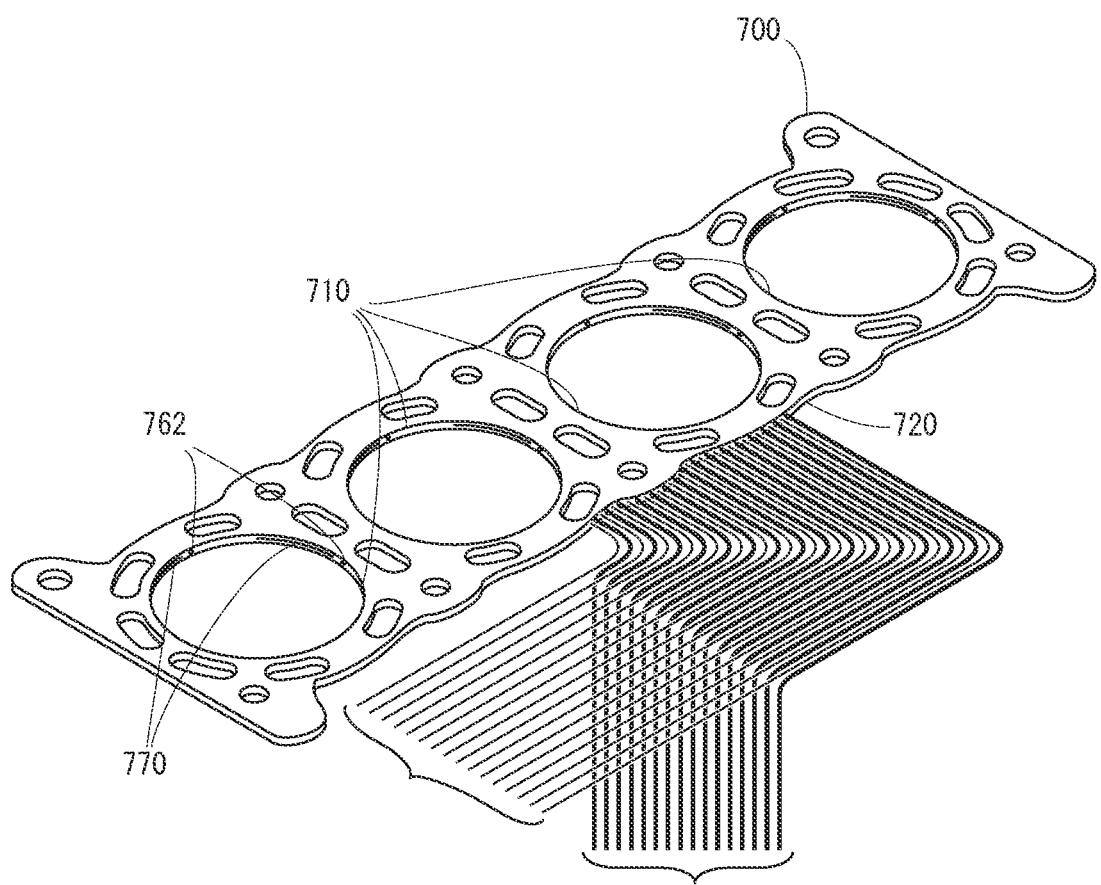
FIG. 2 shows a diagrammatic perspective view of the gasket in the first embodiment of the present disclosure.

Gasket 700 of the first embodiment of the present disclosure, shown in FIG. 2, is installed between cylinder block 100 and cylinder head 300. Gasket 700 is shaped like a thin board with an almost constant thickness. Gasket 700 has an opening corresponding to cylinder 110. Additionally, gasket 700 has holes corresponding to the water jacket and bolt holes. These do not restrict interpretation of the gasket shape targeted by the present disclosure.

Figure 3:
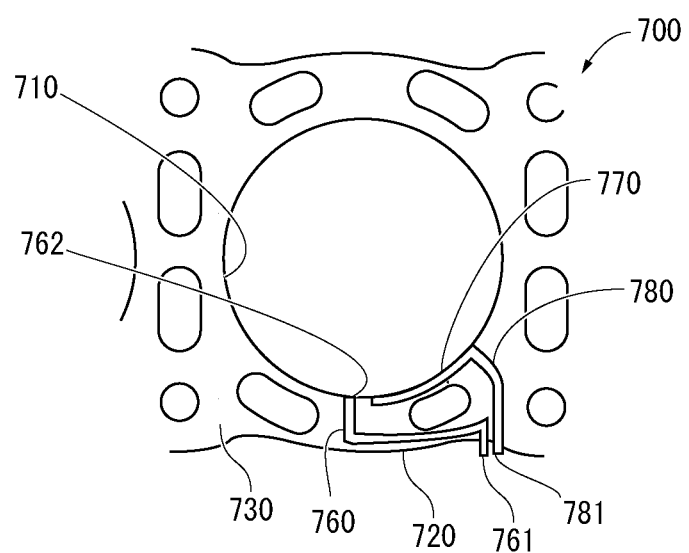
FIG. 3 shows a cross-sectional view along the surface, seen from thickness direction, of the gasket of near one opening of the gasket in the first embodiment of the present disclosure.
Figure 4:
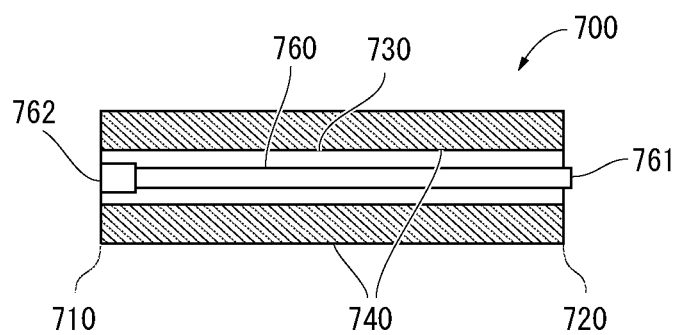
FIG. 4 shows an enlarged vertical cross-sectional view, along the discharge line, of the gasket in the first embodiment of the present disclosure.

As shown in FIGS. 3 and 4, discharge line 760 is installed in intermediate layer 730 of gasket 700 in the thickness direction. The intermediate layer 730 in the thickness direction is a layer formed in the middle part of the direction of thickness. The intermediate layer 730 is made from ceramics. Intermediate layer can also be made from synthetic rubbers, fluoroplastics, silicone resin, synthetic resin, such as a meta system of aramid fiber seats, and heatproof paper, for example. Thus, the intermediate layer may be made from a dielectric or from an insulator. Discharge line 760 is made from copper line, but may be made from another conductive material. Discharge line 760 is buried between outer peripheral edge 720 and opening 710 of gasket 700. The outside edge of discharge line 760 is exposed from outer peripheral edge 720 of gasket 700 to become first connector 761. Moreover, the inside edge of the discharge line 760 is exposed from the outer edge of the gasket 700 towards the center of opening 710 to become electrode 762. Surface layers 740, which exist on both sides of intermediate layer 730 in the thickness direction, are made from a conductive material. One surface layer 740 comes in contact with one surface of cylinder block 100 when gasket 700 is installed between cylinder block 100 and cylinder head 300. The other surface layer 740 comes in contact with one surface of cylinder head 300. Surface layers 740 are made from metal, although they could also be made from other materials. Although both surface layers 740 in the thickness direction are made from a conductive material in this embodiment, the present disclosure includes the case in which only one surface layer to the intermediate layer 730 in the thickness direction is made from a conductive material. Therefore, when the cylinder block 100, cylinder head 300 or surface layer 740 is grounded, and voltage is applied between first connector 761 and a ground member, which can be the cylinder block 100, cylinder head 300 or surface layers 740, a discharge is generated between first connector 761 and the ground member. In this embodiment, part of discharge line 760 except the electrode and the electrode are formed from the same material as one body. However, part of discharge line except the electrode and the electrode are formed separately and connected. Part of discharge line 760 except the electrode and the electrode are made from the different material.

Figure 5:
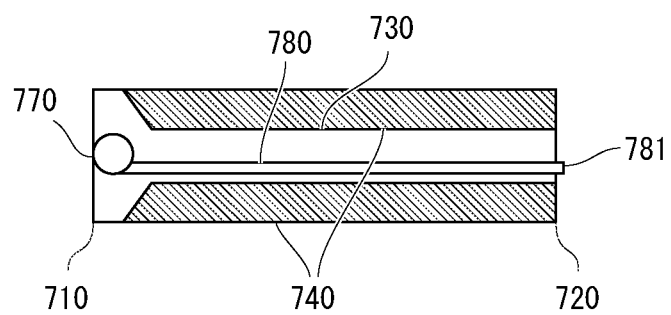
FIG. 5 shows an enlarged vertical cross-sectional view, along the electromagnetic wave transmission line, of the gasket in the first embodiment of the present disclosure.

As shown in FIGS. 3 and 5, antenna 770 is installed in gasket 700. Antenna 770 is made from metal, although it could also be made from any conductive material, insulator, or dielectric provided that electromagnetic waves radiate well from the antenna to the combustion chamber when they are applied between the antenna and the grounded members. Antenna 770 is installed in gasket intermediate layer 730 in the thickness direction at the inner peripheral edge around opening 710 to radiate electromagnetic waves to the combustion chamber 400. Antenna 770 is rod-shaped. Its base end is installed in intermediate layer 730 in the thickness direction. A part to leading end except said base end in this antenna 770 is curved in a nearly circular arc. Antenna 770 extends along the inner peripheral edge around the opening 710 in the circumferential direction of the opening 710. For example, the length of the circular arc part of antenna 770 is set to a quarter of the wavelength of the electromagnetic waves so that standing waves are generated in the antenna 770, increasing the electrical field strength at the end of the antenna 770. For example, the length of the circular arc part of antenna 770 is set to a multiple of a quarter wavelengths of the electromagnetic waves so that standing waves are generated in the antenna 770, increasing the electrical field at multiple points, where the anti-nodes of the standing waves are generated, in the antenna 770. Here, the entire length of antenna 770 is almost buried in intermediate layer 730. As shown in FIG. 5, the solid cross-section of antenna 770 is approximately circular for its entire length. The antenna 770 contacts a surface which is an inner edge of opening 710 of intermediate layer 730 from the inside at one concyclic point in the section along its entire length. This part of antenna 770 is exposed from the inner edge of opening 710 to combustion chamber 400 on the section. However, antenna 770 of the present disclosure is not restricted to a circular cross-sectional shape. Antenna 770 may be buried in intermediate layer 730 completely. Additionally, said electrode 762 is located close to a portion of strong electrical field intensity in the antenna 770 due to the electromagnetic waves when the electromagnetic waves are fed to the antenna 770. Here, the leading end of antenna 770 and electrode 762 are close to each other along the inner peripheral edge of opening 710, with a prescribed gap between them. As a result, a stripline track is formed. Thus, when electromagnetic waves are supplied between first connector 761 and said ground member, the electromagnetic waves are radiated from antenna 770 to combustion chamber 400. The ground member may double as the ground side of the stripline track concurrently. For this embodiment, antenna 770 is a rod-shaped monopole antenna that is curved. However, this does not restrict the type of antenna in the gasket of the present disclosure. Therefore, antenna of the gasket of the present disclosure may be dipole type, Yagi-Uda type, single wire type, loop type, phase difference feeder type, grounded type, ungrounded and perpendicular type, beam type, horizontal polarized omni-directional type, corner-reflector type, comb type or other type of linear antenna, microstrip type, planar inverted F type or other type of flat antenna, slot type, parabola type, horn type, horn reflector type, Cassegrain type or other type of solid antenna, Beverage type or other type of traveling-wave antenna, star EH type, bridge EH type or other type of EH antennas, bar type, small loop type or other type of magnetic antenna, or dielectric antenna.

As shown in FIGS. 3 and 5, electromagnetic wave transmission line 780 is installed in intermediate layer 730 of gasket 700 in the thickness direction. Electromagnetic wave transmission line 780 is made from copper line, although it could also be made from any conductive material, insulator, or dielectric provided that electromagnetic waves are transmitted well to the antenna 770 when they are supplied between the antenna and the grounded member. An example of a variation of the electromagnetic wave transmission line is one that consists of a waveguide made from a conductive material or dielectric. Electromagnetic wave transmission line 780 is buried between outer peripheral edge 720 and opening 710 in gasket 700. The outside edge of electromagnetic wave transmission line 780 is exposed from outer peripheral edge 720 of gasket 700 to become second connector 781. The inside edge of electromagnetic wave transmission line 780 connects with antenna 770 in intermediate layer 730. Thus, the electromagnetic waves are led to antenna 770 when electromagnetic waves are supplied between second connector 781 and the grounded member.

Gasket 700 electrically insulates discharge line 760, antenna 770, electromagnetic wave transmission line 780, and both surfaces of the gasket in the thickness direction. Cylinder block 100, cylinder head 300, or surface layer 740 is grounded. The anode of discharge voltage generator 950 is connected to first connector 761. The anode of electromagnetic wave generator 840 is connected to second connector 781. The ground terminals of discharge voltage generator 950 and electromagnetic wave generator 840 are grounded. Discharge voltage generator 950 and electromagnetic wave generator 840 are controlled by controller 880, which has a CPU, memory, and storage etc, and outputs control signals after computing input signals. A signal line from crank angle detector 890 for detecting crank angle of crankshaft 920 is connected to control unit 880. Crank angle detection signals are sent from crank angle detector 890 to controller 880. Therefore, controller 880 receives signals from crank angle detector 890 and controls the actuations of discharge device 810 and electromagnetic wave generator 840. Discharge voltage generator 950 in this embodiment is a 12-V DC power source, but this can also be a piezo element or other device. Electromagnetic wave generator 840 generates electromagnetic waves. Electromagnetic wave generator 840 in this embodiment is a magnetron that generates 2.4-GHz-bandwidth microwaves. However, this does not restrict the control method and the composition of the input-output signals as for the gasket of the present disclosure.

Therefore, the gasket in the first embodiment is installed between the cylinder block 100 and cylinder head 300 so that its opening 710 corresponds to the cylinder 110. A piston 200 fits into the cylinder 110 and reciprocates freely. The internal combustion engine E operating normally as a gasoline engine is assembled up. It makes possible to apply voltage between first connector 761 of the discharge line 760 and the ground member. It makes possible to feed electromagnetic waves between the second connector 781 and the ground member for a constant time. And voltage is applied to the first connector 761 of the discharge line 760 and the grounded member. The electromagnetic waves are fed to the second connector 781 of the electromagnetic wave transmission line and the grounded member at the compression stroke in the actuation of the internal combustion engine E. Therefore, the plasma is generated near the electrode 762. This plasma receives energy of an electromagnetic waves (electromagnetic wave pulse) supplied from the antenna 770 for a given period of time. As a result, the plasma generates a large amount of OH radicals and ozone to promote the combustion. In fact electrons near the electrode 762 are accelerated, fly out of the plasma area, and collide with gas such as air or the air-fuel mixture in surrounding area of said plasma. The gas in the surrounding area is ionized by these collisions and becomes plasma. Electrons also exist in the newly formed plasma. These also are accelerated by the electromagnetic wave pulse and collide with surrounding gas. The gas ionizes like an avalanche and floating electrons are produced in the surrounding area by chains of these electron acceleration and collision with electron and gas inside plasma. These phenomena spread to the area around discharge plasma in sequence, then the surrounding area get into plasma state. In the result of the phenomena as mentioned above it, the volume of plasma increases. Then the electrons recombine rather than dissociate at the time when the electromagnetic wave pulse radiation is stopped. As a result, the electron density decreases, and the volume of plasma decreases as well. The plasma disappears when the electron recombination is completed. A large amount of OH radicals and ozone is generated from moisture in the gas mixture as a result of a large amount of the generated plasma, promoting the combustion of the mixture.

In this case, the cylinder block 100 and cylinder head 300 etc. which are the major structural materials can be used without modification compared with existing internal combustion engines. All that is required are the applying of voltage to the discharge line 760 and the supply of the electromagnetic waves. Thus, it is realized to minimize the time required to design an engine E and facilitate the sharing of many parts between existing internal combustion engines.

The material of surface layers 740 on both sides of intermediate layer 730 in the thickness direction is not restricted in the gasket of the internal combustion engine of the present disclosure. The surface layers may also be a dielectric or insulator. In the gasket of the first embodiment, intermediate layer 730 is made from a dielectric, and surface layers 740 on both sides of intermediate layer 730 in the thickness direction are made from a conductive material. Thus, surface layer 740 works as a ground electrode that pairs with electrode 762 of discharge line 760. The discharge is generated between electrode 762 and surface layer 740. Surface layer 740 also works as a ground conductive material that pairs with electromagnetic wave transmission line 780. The electromagnetic waves are transmitted between electromagnetic wave transmission line 780 and surface layer 740. If the intermediate layer is made from an insulator and the surface layers on both sides of the intermediate layer are made from a conductive material, the same function and effect are also gained. Moreover, if the intermediate layer is made from a dielectric or insulator and the surface layer on at least one side of the intermediate layer is made from a conductive material, the same function and effect are also gained. Additionally, the rigidity of gasket 700 improves because surface layer 740 is made from metal.

The structure and the shape of the antenna are not restricted in the gasket of the internal combustion engine of the present disclosure. The antenna 770 is rod-shaped as for the gasket 700 in the first embodiment among such varied embodiments. The base end of the antenna 770 is installed in the intermediate layer 730 in the thickness direction. A portion, to the leading end except the base end, extends along the inner peripheral edge around the opening 710 in the circumferential direction of the opening 710 in the antenna 770. This makes it possible that the electrical field intensity near the outer edge of the combustion chamber 400, generated by the electromagnetic waves radiated from the antenna 770, is stronger than the electrical field intensity in other areas of the combustion chamber 400. Therefore, the amount of OH radicals and ozone in the vicinity of the outer edge of the combustion chamber 400 is more than the amount of other areas. Combustion in this area is promoted more than in other areas. Mixing of OH radicals or ozone and the air-fuel mixture is promoted by Squish Flow, Tumble or Swirl in the vicinity of the outside edge of the combustion chamber 400.

The positional relationship between the antenna and the electrode is not restricted in the gasket of the internal combustion engine of the present disclosure. Electrode 762 is located close to a portion of strong electrical field intensity in the antenna 770 due to the electromagnetic waves when the electromagnetic waves are fed to the antenna 770 in the first embodiment among such varied embodiments. This makes it possible that the electrical field intensity, due to the electromagnetic waves radiated from said portion of the antenna 770, is stronger than the electrical field intensity of the surrounding electromagnetic waves. Therefore, the energy of the electromagnetic wave pulse is intensively supplied to the plasma generated by discharge at the electrode 762. As a result, a large amount of OH radicals and ozone is efficiently generated, further promoting combustion in the area centered at the electrode 762. When there are multiple areas of the antenna 770 with strong electrical field intensity, combustion at multiple areas of the combustion chamber 400 is further promoted upon the portion approaching to the electrode 762.

Other embodiments of the gasket of the present disclosure will be described in the following paragraphs. In the description of the gasket of these other embodiments, members and portions, which fulfill the same function as the gasket 700 in the first embodiment, will be applied to the same reference characters used in the first embodiment. The description of these members and portions will be omitted. And, difference points of the composition from the gasket 700 in the first embodiment will be explained about the gaskets of these other embodiments. Therefore, the composition without the description is the same as the composition of the gasket 700 in the first embodiment.

Figure 6:
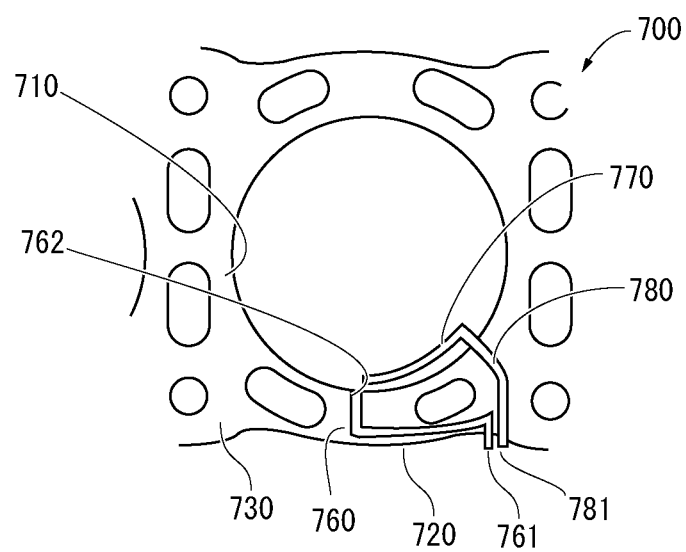
FIG. 6 shows a cross-sectional view along the surface, seen from thickness direction, of the gasket of near one opening of the gasket in the second embodiment of the present disclosure.

FIG. 6 shows the second embodiment of gasket 700. In the first embodiment of gasket 700, the entire length of antenna 770 is almost buried in intermediate layer 730. In the second embodiment, the base end of antenna 770 is located in intermediate layer 730 in the thickness direction; the remainder of antenna 770 extends out from intermediate layer 730 towards the center of opening 710, and then has an L-shaped curve. The end of antenna 770 is curved in an almost circular arc, and extends along the inner peripheral edge around opening 710. Because antenna 770 of the first embodiment of gasket 700 is almost buried in intermediate layer 730 for its entire length, the heat load received from combustion chamber 400 and the fatigue of antenna 770 due to machine vibration is reduced. However, because antenna 770 is exposed to combustion chamber 400 in the second embodiment, the electrical field intensity due to the electromagnetic waves radiated from antenna 770 becomes stronger. Other functions and effects are similar to those described for the first embodiment of gasket 700.

Figure 7:
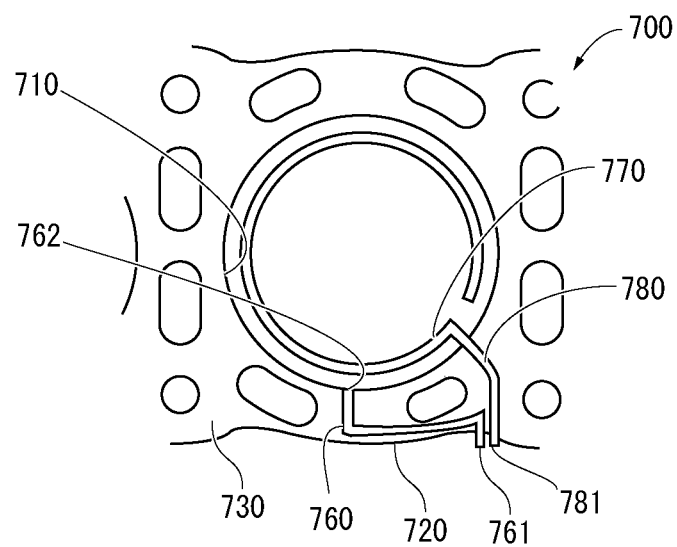
FIG. 7 shows a cross-sectional view along the surface, seen from thickness direction, of the gasket of near one opening of the gasket in the third embodiment of the present disclosure.
Figure 8:
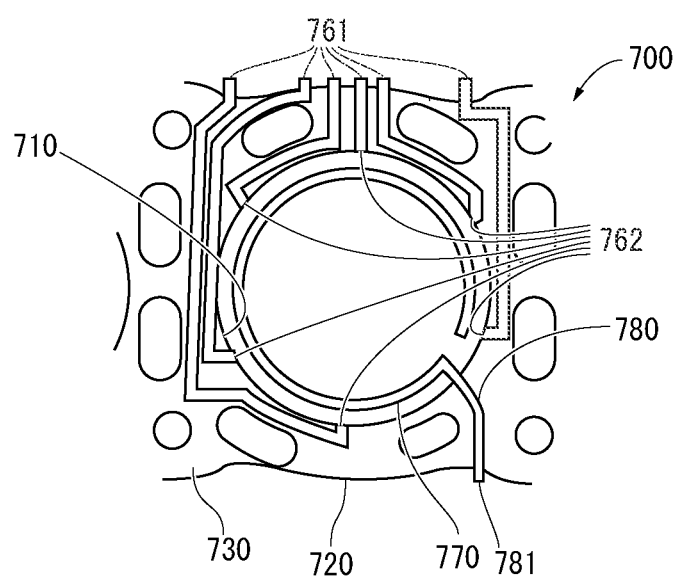
FIG. 8 shows a cross-sectional view along the surface, seen from thickness direction, of the gasket of near one opening of the gasket in the forth embodiment of the present disclosure.

FIG. 7 shows the third embodiment of gasket 700. Here, antenna 770 of this gasket 700 is longer than one in the second embodiment, although both gaskets are similar. The remainder of antenna 770 extends from the base end towards the center of opening 710, and then has an L-shaped curve. The end of antenna 770 is curved in an almost circular arc, and extends along the inner peripheral edge around opening 710 for one entire loop. This makes it possible to earn the length of antenna 770 and strengthen up the electrical field intensity due to the electromagnetic waves radiated from the antenna. Other functions and effects are similar to those described for the first embodiment of gasket 700. When antenna 770 becomes long like this, the standing waves are generated in the antenna 770. Therefore, two or more portions, of which the electrical field intensity due to the electromagnetic waves becomes strong in the antenna 770, can be in existence. The portions like this are more than the gasket having a shorter antenna if the wavelength of electromagnetic waves are same. In the fourth embodiment of gasket 700, there are two or more electrodes 762 along the inner peripheral edge, spaced equally in gasket 700, as shown in FIG. 8, though in the second embodiment of gasket 700 there is one electrode 762. Each Electrode 762 is located close to an area with strong electrical field intensities due to the electromagnetic waves radiated by the antenna 770. This makes it possible that the electrical field intensity, due to the electromagnetic waves radiated from said portion of the antenna 770, are stronger than the electrical field intensity of the surrounding electromagnetic waves. Therefore, the energy of the electromagnetic wave pulse from said portion is intensively supplied to the plasma generated by discharge at each electrode 762. As a result, a large amount of OH radicals and ozone is efficiently generated, further promoting combustion in the area centered at the electrode 762. Combustion at multiple areas of the combustion chamber 400 is further promoted.

Figure 9:
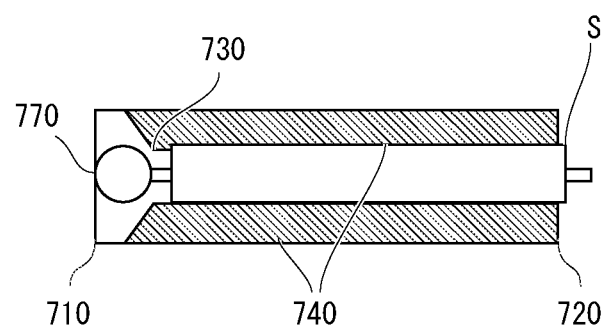
FIG. 9 shows an enlarged vertical cross-sectional view, along the electromagnetic wave transmission line, of the gasket in the fifth embodiment of the present disclosure.

FIG. 9 shows the fifth embodiment of gasket 700. In the first embodiment of gasket 700, not only discharge line 760 but electromagnetic wave transmission line 780 is made from copper wire. In the fifth embodiment, shielded cable S is installed in intermediate layer 730 and the cable core of the inner electrical cable of shielded cable S works as a an electromagnetic wave transmission line 780. Shielded cable S comprises an inner wire, an external conductive material, and an external covering. The inner wire includes a core wire made from a conductive material such as copper, and an inner covering for the core wire made from an insulator. The external conductive material is made from a conductive material that covers the inner wire. The external covering is made from an insulator that covers the external conductive material. This makes the production of the gasket comparatively easy by using the shielded cable S. Other functions and effects are similar to those described for the first embodiment of gasket 700. Shielded cable S may be installed in intermediate layer 730, and discharge line 760 may be composed of the cable core with an inner wire of shielded cable S.

Figure 10:
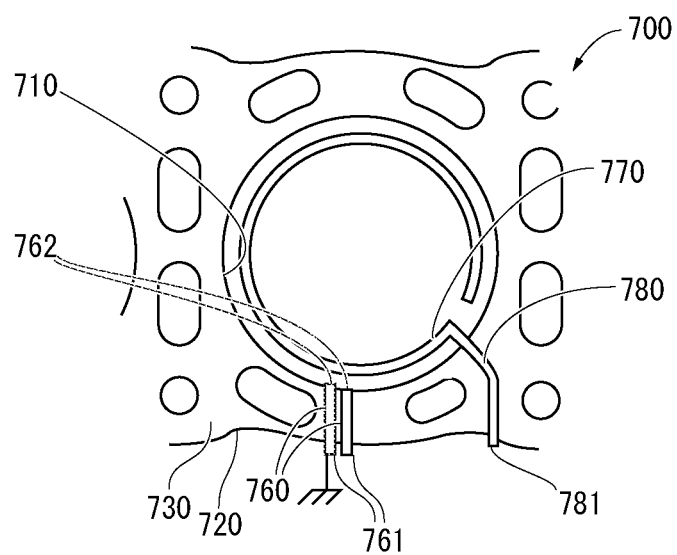
FIG. 10 shows a cross-sectional view along the surface, seen from thickness direction, of the gasket of near one opening of the gasket in the sixth embodiment of the present disclosure.

FIG. 10 shows the sixth embodiment of gasket 700. In the first embodiment of gasket 700, discharge line 760 is installed in intermediate layer 730 in the thickness direction. The anode of voltage generator 950 is connected with first connector 761 of discharge line 760. Cylinder block 100, cylinder head 300, or surface layer 740 is grounded to become a ground member. When voltage is applied between first connector 761 and said ground member, a discharge is generated between first connector 761 and the ground member. In the sixth embodiment, a pair of discharge lines 760 is installed in intermediate layer 730 of gasket 700. The outside edge of each discharge line 760 is exposed from outer peripheral edge 720 of gasket 700 to become first connector 761. Moreover, the inside edge of the each discharge line 760 is exposed from the outer edge of the gasket 700 towards the center of opening 710 to become electrode 762. These electrodes 762 of discharge lines 760 are arranged adjacent to each other. This makes it possible that a discharge is generated between the electrodes when voltage is applied between first connection parts of the discharge line 760. When the electrodes 762 of these discharge lines 760 are arranged adjacent to each other, a discharge can be generated using a low voltage. And the generation of OH radicals and ozone is promoted. The duration of this generated OH radicals and ozone becomes long. Power consumption is reduced. Moreover, the amount of nitrogen oxide (NOx) in the internal combustion engine is reduced because of the reduced of temperature rise in the area where discharge is generated. Other functions and effects are similar to those described for the first embodiment of gasket 700.

In the gasket of the present disclosure, a pair of the electrodes or the ground member pair with this may be covered with a dielectric. In this case, the dielectric-barrier discharge is generated by voltage applied between the electrodes or between the electrode and the ground member. The dielectric-barrier discharge is restricted because charges are accumulated in the surface of the dielectric covering the electrode or the ground member. Therefore, the discharge is generated on a very small scale over a very short period of time. Thermalization does not occur in the area surrounding the discharge because the discharge is terminated after a short period of time. Therefore, the gas temperature rise due to the discharge between the electrodes is reduced, which reduces the amount of NOx produced by the internal combustion engine.

The internal combustion engine of the present disclosure is explained by the description about the internal combustion engine E in the embodiments and the gasket 700 in the embodiments so far. In fact, the internal combustion engine of the present disclosure is the internal combustion engine, which comprises the cylinder block 100, the cylinder head 300, and the gasket 700 of the present disclosure. The cylinder 110, into which the piston 200 fits to reciprocate freely, is formed in the cylinder block 100 so as to penetrate the cylinder block 100. The cylinder head 300 is assembled on the anti-crankcase side of the cylinder block 100 to constitute the combustion chamber 400 with the piston 200 and the cylinder110. The gasket 700 is assembled between the cylinder block 100 and the cylinder head 300.

The present disclosure includes some embodiments that combine the characteristics of the embodiments described above. Moreover, the embodiments described above are only examples of a gasket of an internal combustion engine and internal combustion engine of the present disclosure.

Thus, the description of these embodiments does not restrict interpretation of gasket of an internal combustion engine and internal combustion engine of the present disclosure.

The invention claimed is:

1. A gasket of an internal combustion engine, installed between a cylinder block and a cylinder head so that an opening of the gasket corresponds to a cylinder, allowing a piston to fit into the cylinder and reciprocates freely, such that the cylinder penetrates the cylinder block, and the cylinder head is assembled on an anti-crankcase side of the cylinder block to create a combustion chamber with the piston and the cylinder, the gasket of an internal combustion engine, comprising:

a discharge line installed in an intermediate layer in a thickness direction, having an outer end exposed from an outer peripheral edge to be a first connection part and an inner end exposed from an inner peripheral edge around the opening to be an electrode, and configured such that discharge is generated between electrodes or the electrode and a ground member around it with voltage applied between first connection parts or the first connection part and the ground member;

an antenna installed at least partly in the intermediate layer in the thickness direction at the inner peripheral edge around the opening to radiate electromagnetic waves into the combustion chamber; and an electromagnetic wave transmission line installed in the intermediate layer in the thickness direction, having an outer end exposed from the outer peripheral edge to be a second connection part and an inner end connected to the antenna, and guiding electromagnetic waves to the antenna;

wherein the discharge line, the antenna, and the electromagnetic wave transmission line are electrically insulated from both surfaces of the gasket in the thickness direction.

2. The gasket of an internal combustion engine according to claim 1, wherein
the intermediate layer is made from an insulator or dielectric, and a surface layer on at least one side of the intermediate layer in the thickness direction, is made from a conductive material.

3. The gasket of an internal combustion engine according to claim 1, wherein
the antenna is rod-shaped, the base end of the antenna is installed in the intermediate layer in the thickness direction, and a portion, to the leading end except the base end, extends along the inner peripheral edge around the opening in the circumferential direction of the opening.

4. The gasket of an internal combustion engine according to claim 1, wherein
the electrode is located close to a portion of strong electrical field intensity in the antenna due to the electromagnetic waves when the electromagnetic waves are fed to the antenna.

5. The gasket of an internal combustion engine according to claim 1, wherein
a shielded cable is installed in the intermediate layer, and the cable core of the inner electrical cable of the shielded cable works as the discharge line or the electromagnetic wave transmission line.

6. The gasket of an internal combustion engine according to claim 1, wherein
a plurality of discharge lines are coupled, and the electrodes of these discharge lines are close to each other.

7. An internal combustion engine, comprising;
a cylinder block in which a cylinder is formed to penetrate it and a piston fits into the cylinder and reciprocates freely;
a cylinder head assembled on an anti-crankcase side of the cylinder block to create a combustion chamber with the piston and the cylinder; and
a gasket of an internal combustion engine comprising:
a discharge line installed in an intermediate layer in a thickness direction, having an outer end exposed from an outer peripheral edge to be a first connection part and an inner end exposed from an inner peripheral edge around the opening to be an electrode, and configured such that discharge is generated between electrodes or the electrode and a ground member around it with voltage applied between first connection parts or the first connection part and the ground member;
an antenna installed at least partly in the intermediate layer in the thickness direction at the inner peripheral edge around the opening to radiate electromagnetic waves into the combustion chamber; and
an electromagnetic wave transmission line installed in the intermediate layer in the thickness direction, having an outer end exposed from the outer peripheral edge to be a second connection part and an inner end connected to the antenna, and guiding electromagnetic waves to the antenna;
wherein the discharge line, the antenna, and the electromagnetic wave transmission line are electrically insulated from both surfaces of the gasket in the thickness direction; and
wherein said gasket is located between the cylinder block and cylinder head.

8. The gasket of an internal combustion engine according to claim 2, wherein
the antenna is rod-shaped, the base end of the antenna is installed in the intermediate layer in the thickness direction, and a portion, to the leading end except the base end, extends along the inner peripheral edge around the opening in the circumferential direction of the opening.

9. The gasket of an internal combustion engine according to claim 2, wherein
the electrode is located close to a portion of strong electrical field intensity in the antenna due to the electromagnetic waves when the electromagnetic waves are fed to the antenna.

10. The gasket of an internal combustion engine according to claim 3, wherein
the electrode is located close to a portion of strong electrical field intensity in the antenna due to the electromagnetic waves when the electromagnetic waves are fed to the antenna.

11. The gasket of an internal combustion engine according to claim 2, wherein
a shielded cable is installed in the intermediate layer, and the cable core of the inner electrical cable of the shielded cable works for as the discharge line or the electromagnetic wave transmission line.

12. The gasket of an internal combustion engine according to claim 3, wherein
a shielded cable is installed in the intermediate layer, and the cable core of the inner electrical cable of the shielded cable works as the discharge line or the electromagnetic wave transmission line.

13. The gasket of an internal combustion engine according to claim 4, wherein
a shielded cable is installed in the intermediate layer, and the cable core of the inner electrical cable of the shielded cable works as the discharge line or the electromagnetic wave transmission line.

14. The gasket of an internal combustion engine according to claim 2, wherein
a plurality of discharge lines are coupled, and the electrodes of these discharge lines are close to each other.

15. The gasket of an internal combustion engine according to claim 3, wherein
a plurality of discharge lines are coupled, and the electrodes of these discharge lines are close to each other.

16. The gasket of an internal combustion engine according to claim 4, wherein
a plurality of discharge lines are coupled, and the electrodes of these discharge lines are close to each other.

17. The gasket of an internal combustion engine according to claim 5, wherein
a plurality of discharge lines are coupled, and the electrodes of these discharge lines are close to each other.

* * * * *